United States Patent
Pasqualino et al.

(10) Patent No.: US 7,099,416 B2
(45) Date of Patent: Aug. 29, 2006

(54) SINGLE ENDED TERMINATION OF CLOCK FOR DUAL LINK DVI RECEIVER

(75) Inventors: Christopher R. Pasqualino, Glendora, CA (US); David V. Greig, Arcadia, CA (US)

(73) Assignee: Broadcom Corporation, Irvine, CA (US)

( * ) Notice: Subject to any disclaimer, the term of this patent is extended or adjusted under 35 U.S.C. 154(b) by 918 days.

(21) Appl. No.: 10/135,787

(22) Filed: Apr. 30, 2002

(65) Prior Publication Data

US 2003/0147482 A1 Aug. 7, 2003

Related U.S. Application Data

(60) Provisional application No. 60/354,914, filed on Feb. 6, 2002.

(51) Int. Cl.
  *H01B 1/10* (2006.01)
  *H04B 3/00* (2006.01)
  *H04L 7/00* (2006.01)

(52) U.S. Cl. .............. 375/349; 375/356; 375/372; 375/257

(58) Field of Classification Search ........... 375/257, 375/348–349, 356, 372; 326/20; 327/114, 327/117; 348/469, 720
See application file for complete search history.

(56) References Cited

U.S. PATENT DOCUMENTS

| | | | |
|---|---|---|---|
| 4,388,725 A * | 6/1983 | Saito et al. ............ 375/257 |
| 4,821,296 A | 4/1989 | Cordell | |
| 5,008,636 A | 4/1991 | Markinson et al. | |
| 5,278,873 A | 1/1994 | Lowrey et al. | |
| 5,648,994 A | 7/1997 | Kao | |
| 5,850,154 A * | 12/1998 | Higuchi .................. 326/86 |
| 5,905,769 A | 5/1999 | Lee et al. | |
| 6,219,384 B1 * | 4/2001 | Kliza et al. ............. 375/258 |
| 6,970,010 B1 * | 11/2005 | Wilcox et al. ............ 326/30 |
| 2002/0080883 A1 * | 6/2002 | Tamura et al. ........... 375/257 |
| 2003/0086501 A1 * | 5/2003 | Dreps et al. ............. 375/257 |
| 2003/0142240 A1 * | 7/2003 | Masters .................. 348/720 |
| 2005/0264316 A1 * | 12/2005 | Atkinson ................ 326/30 |

OTHER PUBLICATIONS

Digital Display Working Group, Digital Visual Interface DVI Revision 1.0, Apr. 2, 1999.

* cited by examiner

*Primary Examiner*—Emmanuel Bayard
*Assistant Examiner*—Lawrence Williams
(74) *Attorney, Agent, or Firm*—Garlick, Harrison & Markison; Bruce Garlick

(57) ABSTRACT

A receiver includes clock termination circuitry that is capable of applying either a terminating impedance or a high impedance to a transmission path that carries a clock signal. When multiple of these receivers are used to service data links that share a clock signal, one of the clock termination circuits applies the terminating impedance to the transmission path that carries the clock signal while the other clock termination circuit(s) applies a high impedance to the transmission path. The receiver also includes a plurality of high rate serial bit stream buffers and a clock signal buffer along with the clock termination circuitry. In other embodiments, the receiver includes a deserializer and may include a controller. The receiver may service a dual link Digital Visual Interface.

42 Claims, 8 Drawing Sheets

SINGLE ENDED TERMINATION OF CLOCK FOR DUAL LINK DVI RECEIVER

CROSS REFERENCE TO RELATED APPLICATION

This application claims priority to U.S. Provisional Application Ser. No. 60/354,914, filed Feb. 6, 2002, the disclosure of which is incorporated herein by reference.

FIELD OF THE INVENTION

This invention relates generally to digital communications; and more particularly to high-speed serial data communications.

BACKGROUND OF THE INVENTION

Communication technologies that link electronic devices are well known in the art. Some communication technologies link electronic devices via networks. Examples of such networks include wired computer networks, wireless computer networks, wired telephone networks, wireless telephone networks, and satellite communication networks, among other networks. Within such communication networks, a network infrastructure couples electronic devices to one another. Other communication technologies simply link one electronic device to another electronic device. Examples of these types of links include links between computers and their peripheral devices, links between portable data units and computers, links between video devices sources and video monitors, and links between audio sources and audio playback devices, among other examples. With regard to the computer and peripheral device example, communication links couple the computer to its display, the computer to its printer, the computer to its mouse, and the computer to its keyboard, among links.

Many communication link applications require high data rate throughput with minimal or no errors in the data transmitted. Some of these communication links operate in a parallel fashion in which data is carried on a plurality of physical conductors and is clocked in unison. Other of these communication links operates in a serial fashion in which data is carried on a single physical conductor or multiple physical conductors from the first device to the second device in a serial fashion.

One particular type of serial link is a high-speed bit stream serial link. In a high-speed bit stream serial link, data is transmitted from a transmitting device to a receiving device one bit at a time so that, over time, a plurality of bits of data are transferred. An example of such a high-speed bit stream serial link is described generally in the Digital Visual Interface (DVI) standard promulgated by the Digital Display Working Group. The DVI standard sets forth a high-speed bit stream serial link that carries display information from a video source (transmitter) to a video display (receiver), in one operation. The transmitter may be contained in a computer, a cable modem set top box, a satellite receiver set top box, or another source of video content while the receiver is typically contained in a monitor that displays the visual information received via the high data rate bit stream DVI serial link.

The DVI standard describes the operational characteristics of the physical communication path between the transmitter and the receiver. The DVI standard provides for one or two DVI links, each of which includes a plurality of bit stream paths that is synchronized to a clock signal (bit clock). The bit clock and bits streams may operate at frequencies up to 1.65 Gigahertz. At such operating frequencies, the bit streams traveling along the bit stream path(s) are subject to a number of operating conditions that distort the bits as they pass from the transmitter to the receiver. Distortion of bits caused by dispersion along the conductors carrying the bit streams is generally referred to as inter-symbol interference (ISI). ISI distorts the bits such that extraction of the bits from the bit stream is subject to error. Further, the data bit stream(s) is/are often times not aligned fully with the bit clock. Mis-alignment between a bit stream and the bit clock typically varies over time and is referred to as bit stream jitter. Bit stream jitter often prevents the successful extraction of bits from the bit stream. Whenever bits are not properly extracted by the receiver from the bit stream, data is lost. However, bit stream jitter is common. In many operations, bit stream jitter makes it extraordinarily difficult to successfully meet a data rate, e.g., an error rate of $10^{-9}$ or less.

The quality of the transmission paths that carry the bit streams and the bit clock significantly affects the quality of the received signals. Thus, it is desirable to have "clean" signal paths that minimally affect the quality of the incoming bits. The quality of the termination of these paths is oftentimes inconsistent with the goals of low cost and small size parts. Many functions of a DVI receiver, for example, are now integrated into a single integrated circuit or a small number of integrated circuits mounted on a printed circuit board. These integrated circuits are typically formed in Complementary Metal Oxide Silicon (CMOS) processes that, while significantly functional in digital operations, have analog shortcomings. The shortcomings of these devices in terminating the transmission paths that carry the bit streams and the bit clock can significantly impair the quality of the received signals, resulting in lost data and lower supported operating speeds.

Therefore, there is a need in the art for a DVI receiver that properly terminates the transmit paths that carry incoming signals to avoid degrading signals carried thereupon.

SUMMARY OF THE INVENTION

Thus, in order to overcome the above-described shortcomings, as well as others of the prior devices, a receiver constructed according to the present invention includes clock termination circuitry that is capable of applying either a terminating impedance or a high impedance to a transmission path that carries a clock signal. In this fashion, when multiple of these receivers are used to service multiple data links that share a clock signal, the combination of the clock termination circuits applies a correct terminating impedance to the transmission path that carries the clock signal.

In a first embodiment in which two receivers service a dual link, one of the clock termination circuits operates to apply a terminating impedance to the transmission path that carries the clock signal while the other clock termination circuit(s) applies a high impedance to the transmission path. In a second embodiment in which two receivers service a dual link, each of the clock termination circuits applies a partial terminating impedance, such that these partial terminating impedances combine to equal the correct terminating impedance. In this fashion, receivers of the present invention operate in cooperation with one another to properly terminate the transmission path carrying the clock signal. Thus, the clock signal is not diminished in quality by its termination and use by the receivers. Further, because the structure of the receivers is identical, efficiencies in design and fabrication of the receivers is achieved.

A receiver constructed according to the present invention services a single high rate digital link, such as a DVI link according to the DVI standard, that includes a plurality of high rate serial bit streams and a clock signal. The receiver includes a plurality of data buffers, a clock buffer, and clock termination circuitry. Each of the plurality of data buffers includes an input, buffering circuitry, and an output. The input of each data buffer receives a respective high rate serial bit stream and properly terminates the transmission paths carrying the data. The buffering circuitry of each data buffer buffers the respective high rate serial bit stream. The output of each data buffer produces a buffered representation of the respective high rate serial bit stream. The clock buffer receives and buffers the clock signal and includes an input, buffering circuitry, and an output. The input of the clock buffer receives the clock signal. The buffering circuitry of the clock buffer buffers the clock signal. Finally, the output of the clock buffer produces a buffered representation of the clock signal.

The clock termination circuitry of each receiver couples to a transmission path that carries the clock signal. With the first embodiment, during a first operating condition, the clock termination circuitry applies a terminating impedance to the transmission path. Further, with the first embodiment, during a second operating condition, the clock termination circuitry applies a high impedance to the transmission path that carries the clock signal. With the second embodiment, the clock termination circuitry of the two receivers each terminates the transmission path that carries the clock signal with a partial terminating impedance and the pair of receivers is controlled such that the total impedance applied to the transmission path by the pair of clock termination circuits is the correct terminating impedance.

The receivers may be formed on separate integrated circuits (ICs) or on a single integrated circuit. When two receivers are formed on a single IC, the IC may also include a deserializer and a controller. Thus, when the IC is used to service a DVI link, the single IC performs all required operations for servicing a respective video link. In one embodiment of the clock termination circuitry, the terminating impedance includes a plurality of circuit elements coupled in parallel. These elements may be a series combination of a transistor and a resistor, a resistor, or a transistor.

The terminating impedance of the clock termination circuits in combination matches a surge (characteristic) impedance of the transmission path that carries the clock signal. In the first embodiment, one of the clock termination circuits applies a terminating impedance while the other clock termination circuit applies a high impedance, e.g., an open circuit. In the second embodiment, the parallel combination of the impedances applied by the clock termination circuits equals the terminating impedance. When the receiver operates according to the DVI standard, the clock signal (as well as the high rate serial bit streams) is a differential signal. Thus, in the first embodiment then for the differential clock signal, one of the clock termination circuits applies a pair of approximately fifty-ohm impedances between the conductors of the transmission path that carries the clock signal and a reference voltage while the other clock termination circuit applies an open circuit to the conductors. Further, in the second embodiment, each of the clock termination circuits applies partial terminating impedances between the conductors and the reference voltage such that the combination of both provides an approximate fifty-ohm terminating impedance to each conductor.

In a dual link DVI installation in which each of two receivers includes corresponding clock termination circuitry, with the first embodiment, a preferred one of the clock termination circuits may always apply the matching impedance. Considerations in determining which clock termination circuit will apply the matching impedance include: (1) which clock termination circuit is closer to a coupling location of a DVI cable that carries the data and clock signals; (2) which clock termination circuit corresponds to Link 1; and (3) which termination will result in better termination properties for a given link configuration, e.g., are both links active, is a single link active, etc. Thus, in one operation according to the present invention, the selection of which clock termination circuit to employ will change dynamically, depending upon the immediate operation of the dual link DVI.

Other features and advantages of the present invention will become apparent from the following detailed description of the invention made with reference to the accompanying drawings.

BRIEF DESCRIPTION OF THE DRAWINGS

These and other features, aspects and advantages of the present invention will be more fully understood when considered with respect to the following detailed description, appended claims and accompanying drawings wherein:

DETAILED DESCRIPTION OF THE DRAWINGS

Figure 1A:
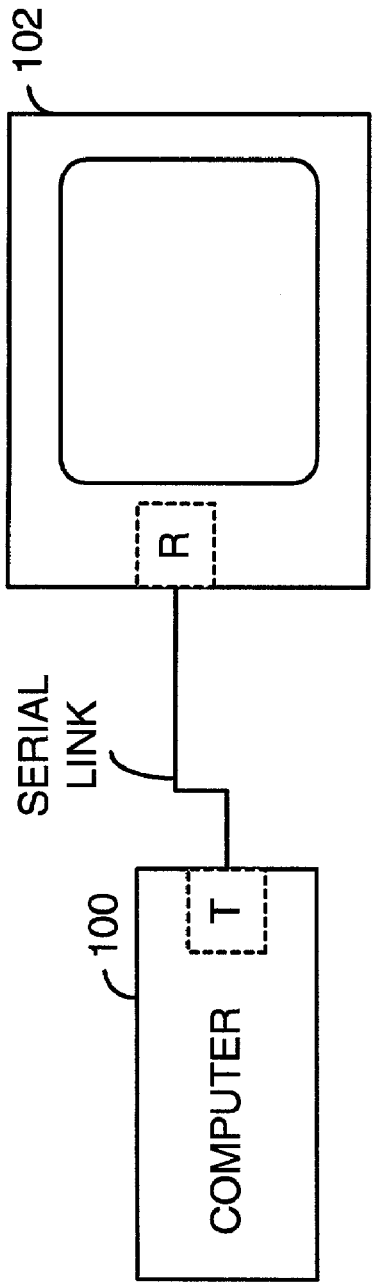
FIG. 1A is a block diagram illustrating a computer and a monitor that intercouple according to the present invention.

FIG. 1A is a block diagram illustrating a computer 100 and a monitor 102 that intercouple according to the present invention. In this embodiment, the computer 100 produces visual information in the form of a high data rate bit stream that it transmits to the monitor 102 via the serial link. As is shown diagrammatically in FIG. 1A, the computer 100 includes a transmitter T while the monitor 102 includes a receiver R. In one embodiment of the serial link, the DVI operating standards are substantially met, except as they may have been modified according to the present invention. In such case, the serial link includes a physical media that carries a plurality of high data rate bit streams and a clock signal (bit clock). The description of the serial link provided herein refers to both single link and dual link operations.

Figure 1B:
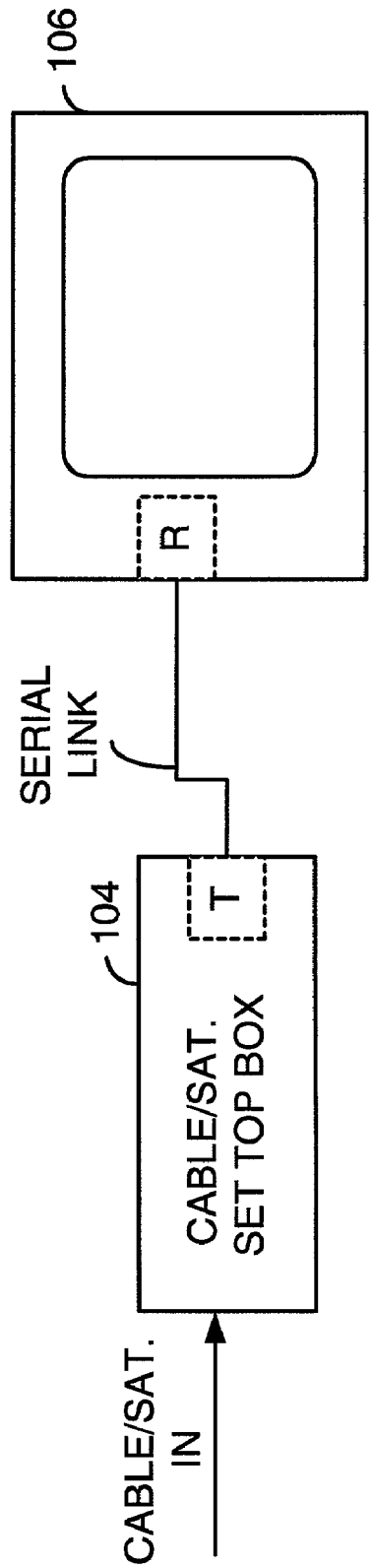
FIG. 1B is a system diagram illustrating a cable/satellite set top box and a video display that intercouple according to the present invention.

FIG. 1B is a system diagram illustrating a cable/satellite set top box and a video display that intercouple according to the present invention. As shown in FIG. 1B, a serial link couples a cable/satellite set top box 104 to a video display 106. The cable/satellite set top box receives input via a cable/satellite input line, processes the cable/satellite input to produce video information, and transmits the video information to the monitor 106 via a serial link that operates according to the present invention. As was the case with the description of FIG. 1A, the serial link of FIG. 1B includes may include a single link DVI or a dual link DVI, both of which are supported by both the cable/satellite set top box 104 and the video display 106.

Figure 2:
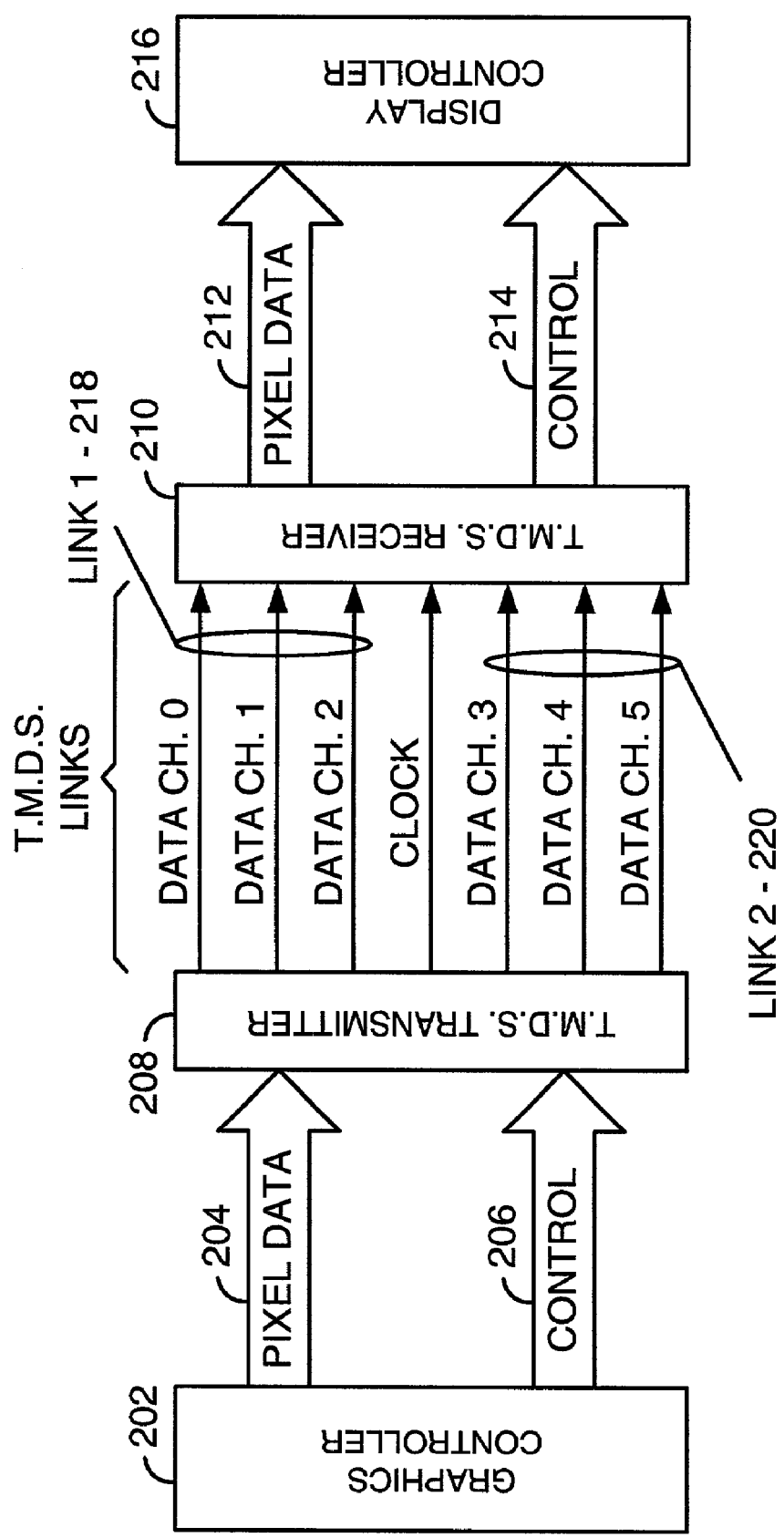
FIG. 2 is a block diagram illustrating a dual link Digital Visual Interface (DVI) that operates according to the present invention.

FIG. 2 is a block diagram illustrating a dual link Digital Visual Interface (DVI) that operates according to the present invention. The dual link DVI couples a graphics controller 202 to a display controller 216. These devices may service the components of FIGS. 1A and 1B, for example. As its output on the transmit side, the graphics controller 202 produces pixel data 204 and control information 206. The pixel data 204 and the control information 206 are received by a Transition Minimized Differential Signaling (T.M.D.S.) transmitter 208 that operates substantially in accordance with the DVI standard. The T.M.D.S. transmitter 208 converts the pixel data 204 and control information 206 into data carried on a plurality of channels and transmits the plurality of channels to a T.M.D.S. receiver 210. A first link of the dual link DVI is link 1 218 that includes data channel 0, data channel 1, and data channel 2. A second link of the dual link DVI is link 2 200 that includes data channel 3, data channel 4, and data channel 5. A single/common clock signal (bit clock) services both link 1 218 and link 2 220.

The T.M.D.S. receiver 210 receives the channels of links 210 and 220 and produces pixel data 212 and control information 214 based there upon. The T.M.D.S. receiver 210 provides the pixel data 212 and the control information 214 to a display controller 216. The display controller 216 outputs display data and control to a monitor that creates a visual image based there upon.

According to the present invention, the clock signal of the T.M.D.S. link is used by the T.M.D.S. receiver 210 to extract information from the channels of both link 1 218 and link 2 220. In order to ensure that the clock signal is as "clean" as possible, the T.M.D.S. receiver 210 includes clock termination circuitry that properly terminates a transmission path that carries the clock signal. As will be described further with reference to FIGS. 3-8C, the clock termination circuitry may be controlled to adapt its operation based upon the termination configuration of the dual link DVI, a coupling location of the transmission path, and other operational characteristics of the T.M.D.S. link. This adaptation may be based upon software instructions, manual CMOS settings, pin settings, or by another technique.

Figure 3:
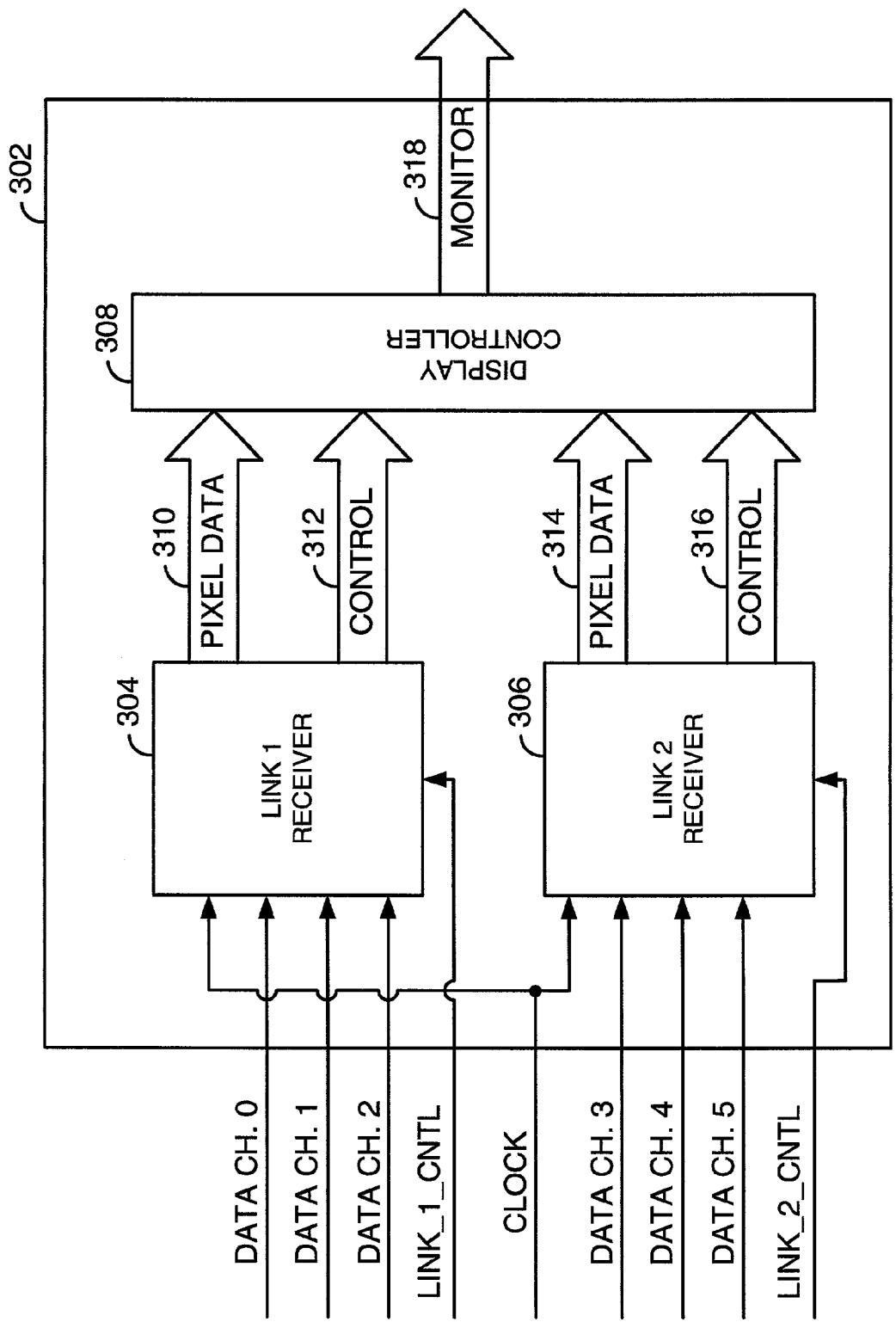
FIG. 3 is a block diagram illustrating the elements of a circuit board that performs dual link DVI receiver operations according to the present invention.

FIG. 3 is a block diagram illustrating the elements of a circuit board 302 that performs dual link DVI receiver operations according to the present invention. Contained on the circuit board 302 are at least three integrated circuits (ICs), including a link 1 IC 304, a link 2 IC 306, and a display controller 308. As shown, the link 1 receiver 304 receives channels 0, 1, and 2 and the clock signal. Further, the link 2 receiver 306 receives channels 3, 4, and 5 and the clock signal. The link 1 receiver produces pixel data 310 and control data 312 while the link 2 receiver produces pixel data 314 and control data 316. The pixel data 310 and 314 and the control data 312 and 316 are received by the display controller that produces a monitor output 318 that drives a coupled monitor.

The clock signal is received by both the link 1 receiver 304 and by the link 2 receiver 306. However, the transmission path that carries the clock signal must be properly terminated to avoid reflections. Thus, the combination of the link 1 receiver 304 and the link 2 receiver 306 must correctly terminate the transmission path that carries the clock signal. As a circuit design goal, it is desirable for the link 1 receiver 304 and the link 2 receiver 306 to be identical. Thus, both the link 1 receiver 304 and the link 2 receiver 306 include clock termination circuitry that is controllable to apply an impedance to the transmission path that carries the clock signal.

In a first embodiment of the receiver 302, one of the clock termination circuits (either of the receivers 304 and 306) applies a terminating impedance to the transmission path that carries the clock signal while the other clock termination circuit applies a high (or open) impedance. In a second embodiment of the receiver 302, the clock termination circuits of the receivers 304 and 306 each applies a partial termination impedance to the transmission path that carries the clock signal such that the combination of these applied partial termination impedances provides a correct terminating impedance. In a particular embodiment in which the present invention is applied to the DVI standard, the clock signal is a differential signal. Thus, correct termination of the transmission path requires a differential termination. The clock termination circuitry and its operations for this differential operation will be described with particular reference to FIGS. 6A through 8C.

Figure 4:
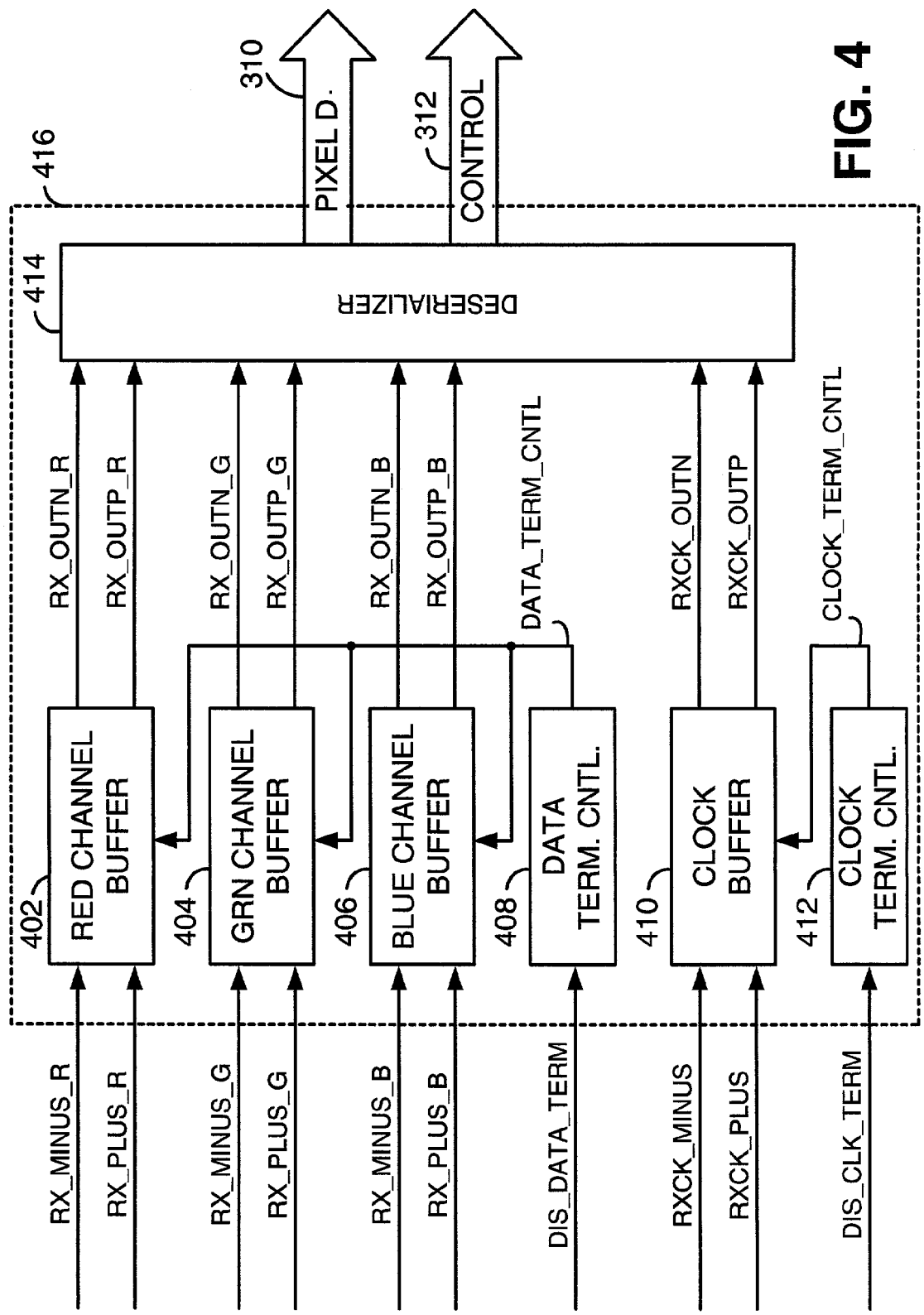
FIG. 4 is a block diagram illustrating the elements of an integrated circuit that services one of the DVI links of the circuit board of FIG. 3.

FIG. 4 is a block diagram illustrating the elements of an integrated circuit 416 that services one of the DVI links of the circuit board of FIG. 3. The integrated circuit 416 may serve as either receiver 304 or receiver 306 of FIG. 3 and has particular applicability to the DVI link of FIG. 2. Still referring to FIG. 4, the integrated circuit 416 includes a red channel buffer 402, a green channel buffer 404, a blue channel buffer 406, and a clock buffer 410. The integrated circuit 416 also includes data termination control block 408 and clock termination control bock 412. The red channel buffer 402, the green channel buffer 404, the blue channel buffer 406, and the clock buffer 410 provide buffered output to a deserializer 414. The deserializer 414 converts the received data to a parallel output and outputs the data as pixel data 310 and control data 312.

The red channel buffer 402, the green channel buffer 404, and the blue channel buffer 406 receive differential red, green, and blue signals, respectively. These buffers 402–406 operate to square the incoming signals, to buffer the incoming signals, and to present a buffered representation thereof to the deserializer 414. These buffers 402, 404, and 406 also correctly terminate the transmission paths that carry the data signals. Circuits employed to terminate these transmission paths may be similar to the circuits illustrated in FIGS. 6A, 7, and 8A–8C. When the integrated circuit 416 serves as the receiver 304 of FIG. 3, the red, green, and blue signals correspond to channels 0, 1, and 2, respectively. Likewise, when the integrated circuit 416 serves as the receiver 306 of FIG. 3, the red, green, and blue signals correspond to channels 3, 4, and 5, respectively. Each of these signals is a differential signal as specified by the DVI standard.

The data termination control block 408, upon assertion of the DIS_DATA_TERM signal disables the operation of the corresponding red channel buffer 402, green channel buffer 404, and blue channel buffer 406. The disablement of these buffers 402–406 will be performed when the link that these buffers service is disabled. During normal DVI operations, link 1 is usually operational. However, link 2 is not always required and during single link DVI operations, link 2 is not used. Thus, for a DVI receiver having the capability to service dual link DVI operations, link 2 may be sometimes disabled. In such an operating condition, DIS_DATA_TERM is asserted and the circuitry required to service link 2 is shut down.

The clock buffer 410 receives a differential clock signal and operates to square the clock signal and to present a buffered representation thereof to the deserializer 414. The clock buffer also includes clock termination circuitry that is capable of terminating the differential clock signal that includes RXCK_MINUS and RXCK_PLUS. During a first operating condition, the clock termination circuitry applies terminating impedance to the transmission path that provides the clock signal. During a second operating condition, the clock termination circuitry applies a high impedance to the transmission path. In the described embodiment, the terminating impedance is a matching impedance that couples between a corresponding conductor of the transmission path, e.g., a conductor of the transmission path that carries RXCK_PLUS, and a reference voltage. The high impedance is the open circuit impedance of the terminating impedance. These terminations will be described in detail with reference to FIGS. 6A through 8C.

In alternate operation of the clock buffer 410, the clock buffer 410 applies partial terminating impedances to the conductors that carry RXCK_PLUS and RXCK_MINUS. The partial terminating impedances applied thereto are such that, in combination with partial terminating impedances applied by a second (or more) clock termination circuits of other clock buffers that service the link, a correct terminating impedance is applied to the transmission path that carries the shared clock signal.

Figure 5:
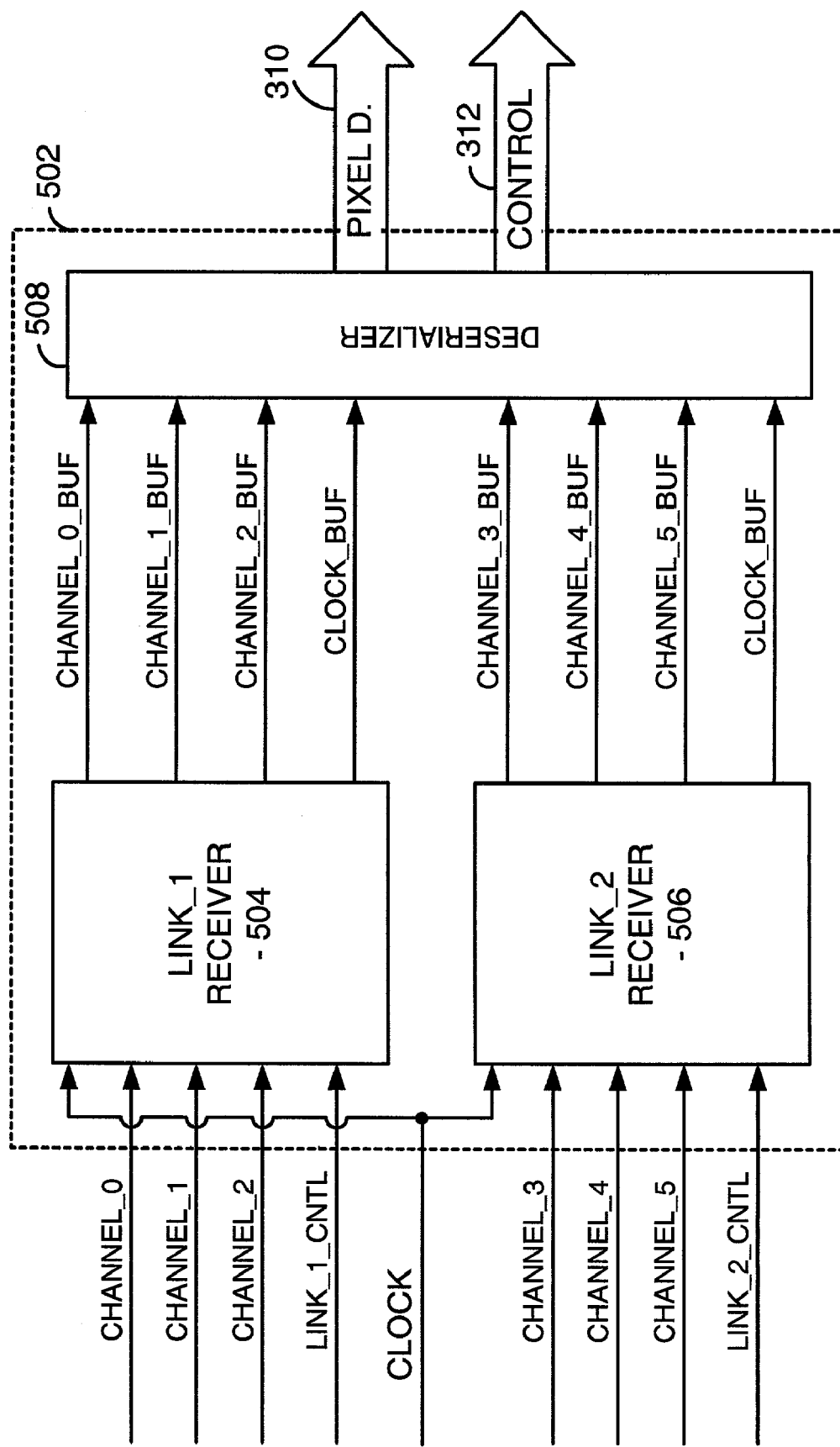
FIG. 5 is a block diagram illustrating the elements of an integrated circuit that performs dual link DVI receiver operations according to the present invention.

FIG. 5 is a block diagram illustrating the elements of an integrated circuit (IC) 502 that performs dual link DVI receiver operations according to the present invention. The IC 502 includes a link 1 receiver 504, a link 2 receiver 506, and a deserializer 508. The IC 502 components illustrated in FIG. 5 perform substantially the same functions as the multiple IC components of the circuit board 302 of FIG. 3. However, the IC 502 components of FIG. 5 are formed on a single semi-conductive substrate using a CMOS process, for example.

With the IC 502 of FIG. 5, a single clock signal is provided to the IC 502. Thus, each of the receivers 504 and 506 include clock termination circuitry. Separate link control inputs to the receivers 504 and 506 control the operation of the receivers 504 and 506. Such operational control includes the control of the included clock termination circuitry. However, in another embodiment of the IC 502, the clock termination circuitry is separate from the receivers 504 and 506.

Figure 6A:
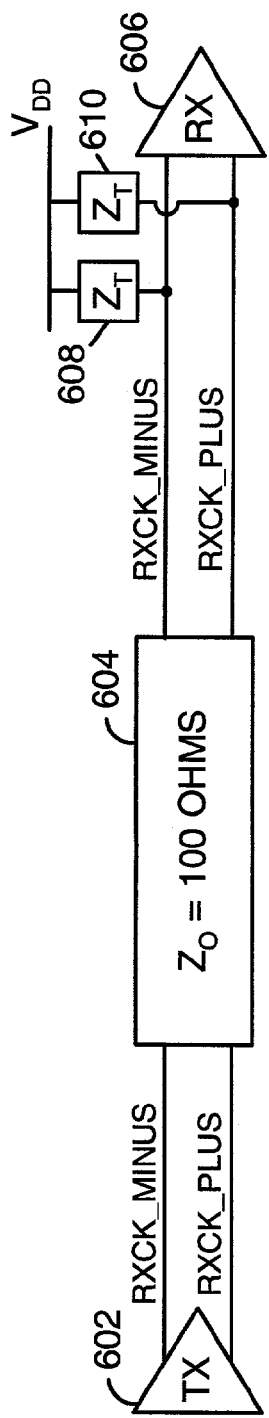
FIG. 6A is a block diagram illustrating single link DVI clock termination according to the present invention.

FIG. 6A is a block diagram illustrating single link DVI clock termination according to the present invention. In the structure of FIG. 6A, a transmitter 602 located in the computer 100 of FIG. 1A or the cable set top box 104 of FIG. 1B, for example, generates a differential clock signal having RXCK_MINUS and RXCK_PLUS differential components. The transmission path 604 that carries the clock signal has a differential surge (characteristic) impedance of 100 Ohms. Thus, the clock terminating circuitry that terminates the transmission path 604 includes a first terminating component 608 of 50 Ohms and a second terminating component 610 of 50 Ohms, each of which terminates a respective conductor of the transmission path 604 to a high reference voltage, $V_{DD}$. The clock terminating circuitry is located proximate a receiver 606 to minimize reflections. The receiver 606, in the described embodiment, has high input impedance.

Figure 6B:
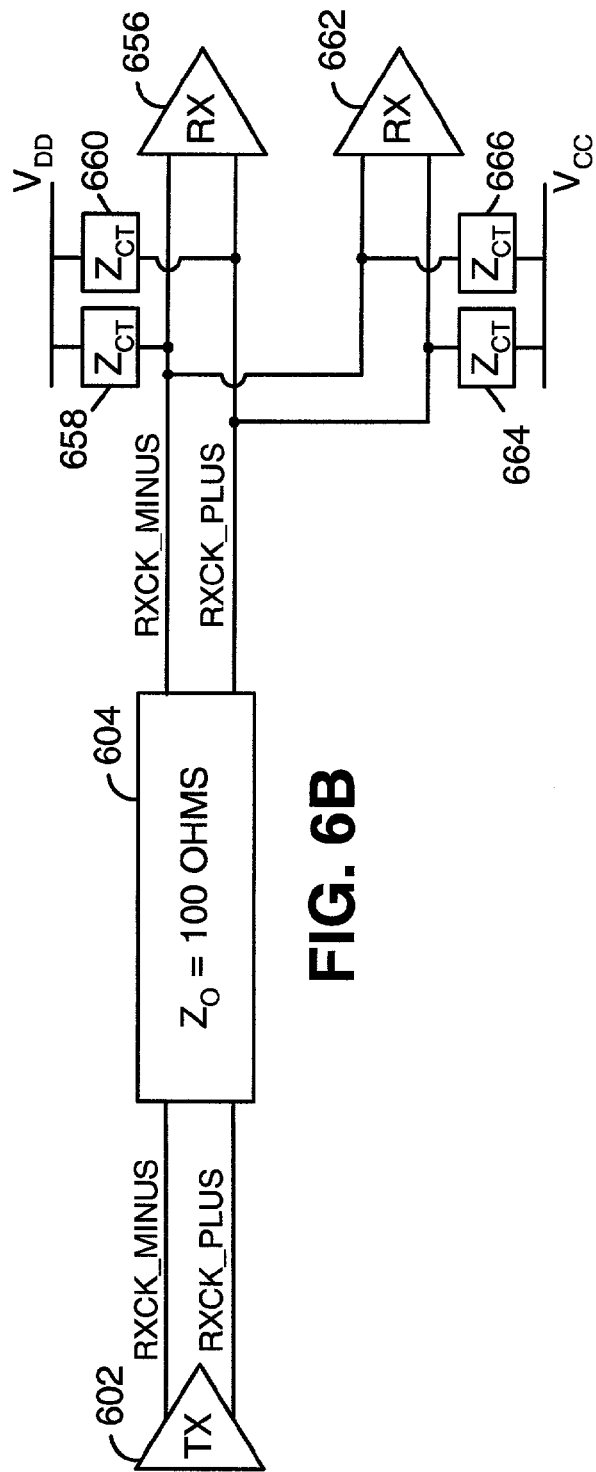
FIG. 6B is a block diagram illustrating dual link DVI clock termination according to the present invention.

FIG. 6B is a block diagram illustrating dual link DVI clock termination according to the present invention. The circuit of FIG. 6B is similar to the circuit of FIG. 6A except that the differential clock signal is provided to both a first receiver 656 (Link 1) and a second receiver 662 (Link 1). The first receiver 656 has associated therewith clock termination circuitry that includes first controllable termination element 658 and second controllable termination element 660. Likewise, the second receiver 662 has associated therewith clock termination circuitry that includes first controllable termination element 664 and second controllable termination element 666.

According to operation of the present invention, the clock termination circuitry of Link 1 and Link 2 may operate in various manners. These operating conditions are summarized in Table 1. Either of both of the dual links may be terminated for the particular application. Further, for a link that is terminated, it may be either active or idle. According to one aspect of the DVI standard, when only a single link is employed, that link will be Link 1. In other operations of Table 1, however, Link 2 may be active without Link 1 being active.

In the operations summarized in Table 1, as long as the clock termination circuitry is connected to the transmission path 604 that carries the clock signal, it may be operated to apply a terminating impedance (or partial terminating impedance) to the transmission path 604. Thus, when both clock termination circuits are coupled to the transmission path 604, according to the first embodiment, one of the clock termination circuits applies a terminating impedance while the other applies a high impedance. Either may apply the terminating impedance, even if a corresponding link receiver is inactive. According to the second embodiment, each of the clock termination circuits applies a partial terminating impedance. Thus, in dual link DVI installations in which each of two receivers includes clock termination circuitry, one of the clock termination circuits will apply the terminating impedance and the other will apply high impedance.

TABLE 1

Terminating Conditions for Various Operating Configurations

| Operating Condition of Dual Link Receiver | Link 1 Clock termination Circuit | Link 2 Clock termination Circuit |
|---|---|---|
| Link 1 Connected and Active Link 2 Disconnected | Terminating Impedance | N/A |
| Link 1 Disconnected Link 2 Connected and Active | N/A | Terminating Impedance |
| Link 1 Connected and Active Link 2 Connected but Inactive | Terminating Impedance | High Impedance |
| Link 1 Connected and Active Link 2 Connected but Inactive | High Impedance | Terminating Impedance |
| Link 1 Connected but Inactive | High Impedance | Terminating |

TABLE 1-continued

Terminating Conditions for Various Operating Configurations

| Operating Condition of Dual Link Receiver | Link 1 Clock termination Circuit | Link 2 Clock termination Circuit |
|---|---|---|
| Link 2 Connected and Active Link 1 Connected but Inactive | Terminating Impedance | Impedance High Impedance |
| Link 2 Connected and Active Link 1 Connected and Active Link 2 Connected and Active | Terminating Impedance | High Impedance |
| Link 1 Connected and Active Link 2 Connected and Active | High Impedance | Terminating Impedance |
| Link 1 Connected Link 2 Connected | Partial Terminating Impedance | Partial Terminating Impedance |

With the first embodiment, considerations in determining which clock termination circuit will apply the terminating impedance include: (1) which clock termination circuit is closer to a coupling location of a DVI cable that carries the data and clock signals; (2) which clock termination circuit corresponds to Link 1; and (3) which termination will result in better termination properties for a given link configuration, e.g., are both links active, is a single link active, etc. Thus, in one operation according to the present invention, the selection of which clock termination circuit to employ will change dynamically, depending upon the immediate operation of the dual link DVI.

Figure 7:
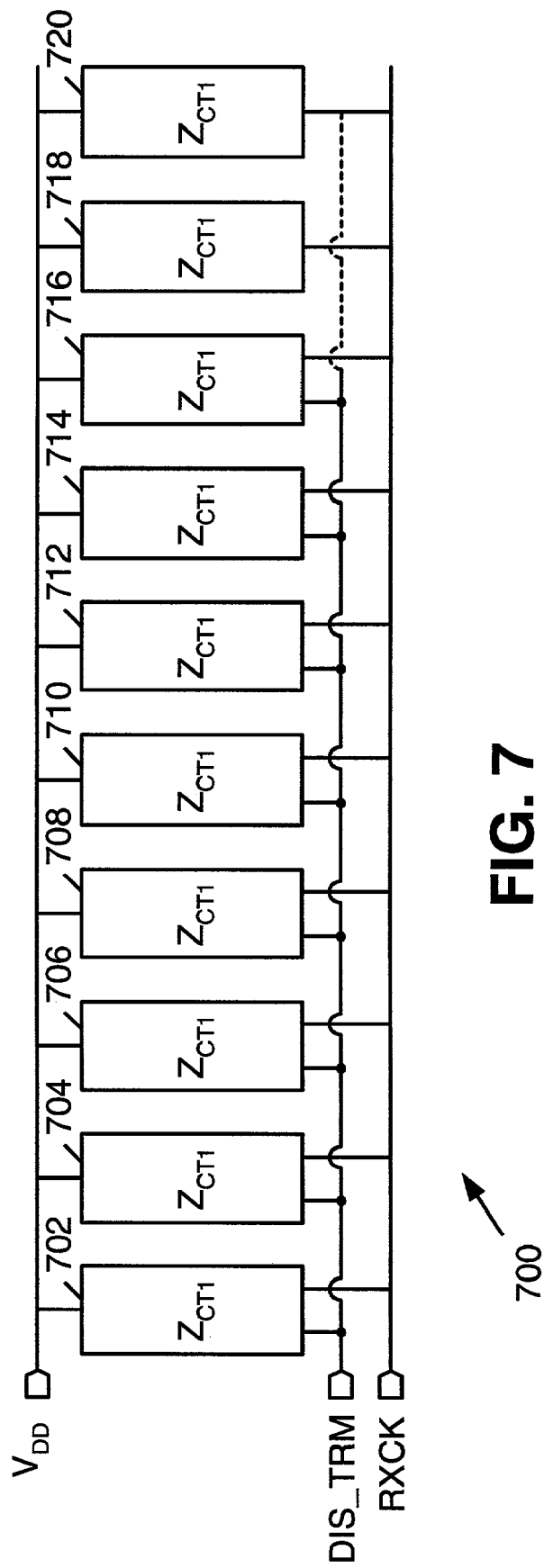
FIG. 7 is a block diagram illustrating a clock termination impedance circuit constructed according to the present invention having a plurality of terminating elements coupled in parallel.

FIG. 7 is a block diagram illustrating a clock termination impedance circuit 700 constructed according to the present invention having a plurality of terminating elements coupled in parallel. The clock termination impedance circuit 700 includes a plurality of terminating elements 702–716 coupled in parallel between an RXCK pad and $V_{DD}$. This clock termination impedance circuit 700 corresponds to one of the clock termination impedances 658, 660, 664, or 666 of FIG. 6B that may be, according to the first embodiment, switched between a terminating impedance and high impedance. In such case, the DIS_TRM input to the plurality of terminating elements 702–716 controls whether the impedances 702–716 are open or not. Various constructions of the plurality of terminating elements 702–716 are described in detail with reference to FIGS. 8A–8C.

With the second embodiment, the clock termination impedance circuit 700 is controlled by the DIS_TRM signal to apply a partial terminating impedance. With the second embodiment, only the structures of FIGS. 8A and 8B may be employed. Thus, with the second embodiment, the level of the signal DIS_TRM will be within an operating range and be controlled by a clock termination control circuit such that the clock termination impedance circuit 700 applies a correct partial terminating impedance.

The parallel structure of FIG. 7 is chosen to account for the process variations that occur when a CMOS process is employed to create the circuit 700. As is generally known, CMOS process variations may result in variations of the resistance of poly-formed resistors of 30% or more. Thus, with the parallel elements 702–718, the impedance of circuit 700 of FIG. 7 has an impedance with a tight tolerance. Further, after initial testing of the IC, some of the elements may be added to, or removed from the circuit 700, e.g., elements 718 and 720 to adjust the overall impedance of the parallel circuit.

Figure 8C:
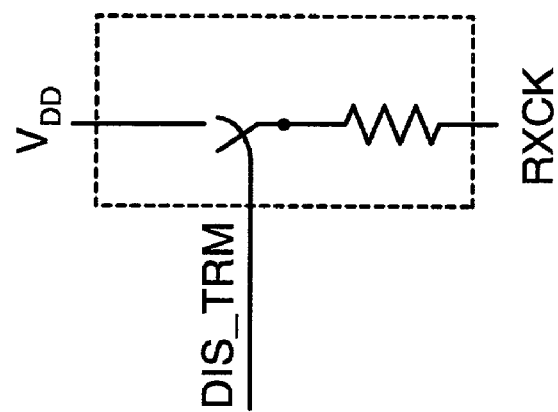
FIG. 8C is a diagram illustrating a third embodiment of a terminating element of the clock termination impedance circuit of FIG. 7.
Figure 8B:
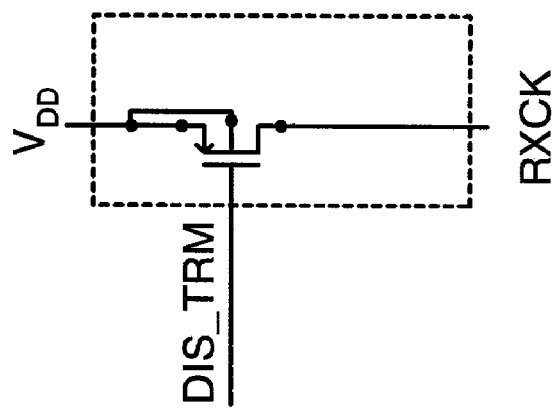
FIG. 8B is a diagram illustrating a second embodiment of a terminating element of the clock termination impedance circuit of FIG. 7.
Figure 8A:
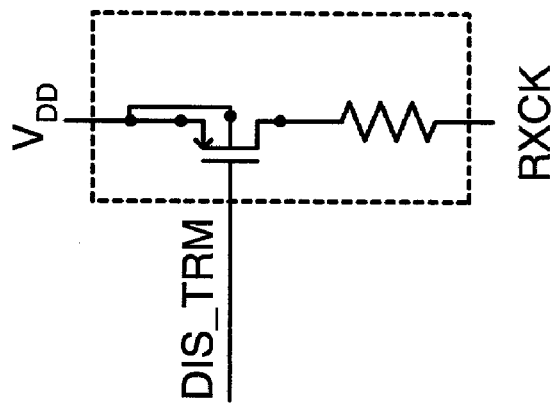
FIG. 8A is a diagram illustrating a first embodiment of a terminating element of the clock termination impedance circuit of FIG. 7.

FIG. 8A is a diagram illustrating a first embodiment of a terminating element of the clock termination impedance circuit of FIG. 7. The terminating element of FIG. 8A includes a transistor in series with a poly-formed resistor, the combination of which extends between RXCK and $V_{DD}$. As shown, for the first embodiment, the signal DIS_TRM controls the operation of the series combination by turning on or turning off the transistor. For the second embodiment, the signal DIS_TRM applies a controlling voltage to the transistor that operates in a triode mode. Thus, with the second embodiment, the impedance generated between $V_{DD}$ and RXCK is variable, dependent upon the level of the DIS_TRM signal.

FIG. 8B is a diagram illustrating a second embodiment of a terminating element of the clock termination impedance circuit of FIG. 7. The terminating element of FIG. 8B includes simply a transistor that extends between RXCK and $V_{DD}$. As shown, for the first embodiment, the signal DIS_TRM controls the operation of the series combination by turning on or turning off the transistor. For the second embodiment, the signal DIS_TRM applies a controlling voltage to the transistor that operates in a triode mode. Thus, with the second embodiment, the impedance generated between $V_{DD}$ and RXCK is variable, dependent upon the level of the DIS_TRM signal.

FIG. 8C is a diagram illustrating a third embodiment of a terminating element of the clock termination impedance circuit of FIG. 7. The terminating element of FIG. 8C includes a passive resistor which extends between RXCK and $V_{DD}$ and that is controlled by a switch, e.g., a transistor operating in cutoff mode. The signal DIS_TRM controls the operation of the switch to either connect or disconnect the passive resistor between $V_{DD}$ and RXCK.

The invention disclosed herein is susceptible to various modifications and alternative forms. Specific embodiments therefore have been shown by way of example in the drawings and detailed description. It should be understood, however, that the drawings and detailed description thereto are not intended to limit the invention to the particular form disclosed, but on the contrary, the invention is to cover all modifications, equivalents and alternatives falling within the spirit and scope of the present invention as defined by the claims.

The invention claimed is:

1. A receiver that receives high rate bit stream data, the receiver comprising:
   a plurality of data buffers, each of which couples to a transmission path carrying a respective high rate serial bit stream, wherein each of the plurality of data buffers includes:
   an input that receives the respective high rate serial bit stream;
   buffering circuitry that buffers the respective high rate serial bit stream; and
   an output that produces a buffered representation of the respective high rate serial bit stream;
   a clock buffer that receives and buffers a clock signal corresponding to the high rate bit stream data and includes:
   an input that receives the clock signal;
   buffering circuitry that buffers the clock signal; and
   an output that produces a buffered representation of the clock signal; and
   clock termination circuitry coupled to a transmission path that carries the clock signal, wherein the clock termination circuitry applies a terminating impedance to the transmission path that carries the clock signal during a first operating condition, and wherein the clock termination circuitry applies a high impedance to the transmission path that carries the clock signal during a second operating condition.

2. The receiver of claim 1, wherein the terminating impedance matches a surge (characteristic) impedance of the transmission path that carries the clock signal.

3. The receiver of claim 2, wherein the high impedance is an open circuit.

4. The receiver of claim 1, wherein the clock signal is a differential signal.

5. The receiver of claim 4, wherein the terminating impedance comprises a pair of approximately fifty-ohm impedances, each of which couples between a respective conductor of the transmission path that carries the clock signal and a reference voltage.

6. The receiver of claim 4, wherein the high impedance is applied to each conductor of the transmission path that carries the clock signal.

7. The receiver of claim 1, wherein the terminating impedance comprises a plurality of circuit elements coupled in parallel.

8. The receiver of claim 7, wherein at least one of the circuit elements comprises a series combination of a transistor and a resistor.

9. The receiver of claim 7, wherein at least one of the circuit elements comprises a resistor.

10. The receiver of claim 7, at least one of the circuit elements comprises a transistor.

11. A receiver that terminates a dual link digital interface, wherein each link of the dual link digital interface comprises a plurality of data channels, and wherein both of the dual links are serviced by a common clock signal, the receiver comprising:
 a first link receiver that terminates a first plurality of data channels and extracts data there from;
 a second link receiver that terminates a second plurality of data channels and extracts data there from;
 a controller coupled to receive data from both the first link receiver and the second link receiver and to produce an output based there from; and
 clock termination circuitry coupled to a transmission path that carries the common clock signal, wherein the clock termination circuitry applies a terminating impedance to the transmission path that carries the common clock signal during a first operating condition, and wherein the clock termination circuitry applies a high impedance to the transmission path that carries the common clock signal during a second operating condition.

12. The receiver of claim 11, wherein the terminating impedance matches a surge (characteristic) impedance of the transmission path that carries the common clock signal.

13. The receiver of claim 12, wherein the high impedance is an open circuit.

14. The receiver of claim 11, wherein the common clock signal is a differential signal.

15. The receiver of claim 14, wherein the terminating impedance comprises a pair of approximately fifty-ohm impedances, each of which couples between a respective conductor of the transmission path that carries the common clock signal and a reference voltage.

16. The receiver of claim 14, wherein the high impedance is applied to each conductor of the transmission path that carries the common clock signal.

17. The receiver of claim 11, wherein the terminating impedance comprises a plurality of circuit elements coupled in parallel.

18. The receiver of claim 17, wherein at least one of the circuit elements comprises a series combination of a transistor and a resistor.

19. The receiver of claim 17, wherein at least one of the circuit elements comprises a resistor.

20. The receiver of claim 17, at least one of the circuit elements comprises a transistor.

21. A receiver that terminates a dual link digital interface, wherein each link of the dual link digital interface comprises a plurality of data channels, and wherein both of the dual links are serviced by a common clock signal, the receiver comprising:
 a first link receiver that comprises;
  a first set of data buffers, each of which terminates a corresponding data channel of the first link and buffers data received there on; and
  first clock termination circuitry coupled to a transmission path that carries the common clock signal, wherein the clock termination circuitry applies a terminating impedance to the transmission path that carries the common clock signal during a first operating condition, and wherein the clock termination circuitry applies a high impedance to the transmission path that carries the common clock signal during a second operating condition; and
 a second link receiver that comprises;
  a second set of data buffers, each of which terminates a corresponding data channel of the second link and buffers data received there on; and
  second clock termination circuitry coupled to a transmission path that carries the common clock signal, wherein the clock termination circuitry applies a high impedance to the transmission path that carries the common clock signal during the first operating condition, and wherein the clock termination circuitry applies a terminating impedance to the transmission path that carries the common clock signal during a second operating condition.

22. The receiver of claim 21, wherein:
 the first link receiver further comprises a deserializer coupled to the first set of data buffers; and
 the second link receiver further comprises a deserializer coupled to the second set of data buffers.

23. The receiver of claim 22, further comprising a controller coupled to the deserializers of the first link receiver and the second link receivers.

24. The receiver of claim 21, further comprising a deserializer that couples to the first link receiver and to the second link receiver.

25. The receiver of claim 24, further comprising a controller coupled to the deserializer.

26. The receiver of claim 21, wherein:
 the common clock signal is a differential signal; and
 the terminating impedance comprises a pair of matched impedances, each of which couples between a respective conductor of the transmission path that carries the common clock signal and a reference voltage.

27. The receiver of claim 21, wherein the terminating impedance comprises a plurality of circuit elements coupled in parallel.

28. The receiver of claim 27, wherein at least one of the circuit elements comprises a series combination of a transistor and a resistor.

29. The receiver of claim 27, wherein at least one of the circuit elements comprises a resistor.

30. The receiver of claim 27, at least one of the circuit elements comprises a transistor.

31. The receiver of claim 27, wherein the receiver components are formed on a single integrated circuit.

32. The receiver of claim 21, wherein in the first operating condition, both the first link and the second link are active.

33. The receiver of claim 21, wherein in the first operating condition, only the first link is active.

34. The receiver of claim 21, wherein in the first operating condition, only the second link is active.

35. A receiver that terminates one link of a multiple link digital interface, wherein each link of the multiple link digital interface comprises a plurality of data channels, and wherein at least two of the links are serviced by a common clock signal, the receiver comprising:
   a set of data buffers, each of which terminates a corresponding data channel and buffers data received there on; and
   clock termination circuitry that terminates the common clock signal, wherein the clock termination circuitry applies a terminating impedance to a clock transmission path that carries the common clock signal during a first operating condition, and wherein the clock termination circuitry applies a partial terminating impedance to the clock transmission path that carries the common clock signal during a second operating condition.

36. The receiver of claim 35, wherein:
   the clock termination circuitry includes a variable impedance that is coupled to the clock transmission path;
   the variable impedance is controlled to apply the terminating impedance during the first operating condition; and
   the variable impedance is controlled to apply the partial terminating impedance during the second operating condition.

37. The receiver of claim 36, the variable impedance includes a plurality of circuit elements coupled in parallel.

38. The receiver of claim 37, wherein at least one of the circuit elements comprises a series combination of a transistor and a resistor.

39. The receiver of claim 37, wherein at least one of the circuit elements comprises a resistor.

40. The receiver of claim 37, at least one of the circuit elements comprises a transistor.

41. A method for terminating a dual link digital interface comprising:
   terminating a first plurality of data channels of a first link of the dual link digital interface;
   extracting data from the first plurality of data channels;
   terminating a second plurality of data channels of a second link of the dual link digital interface;
   extracting data from the second plurality of data channels of the second link;
   receiving a clock signal servicing both links of the dual link digital interface;
   based upon a clock signal that is shared by the first link and the second link, converting the data from the first plurality of data channels and the second plurality of data channels into parallel data and control information;
   at the first link during a first operating condition applying a terminating impedance to a transmission path that carries the common clock signal;
   at the first link during a second operating condition, applying a high impedance to the transmission path that carries the common clock signal;
   at the second link during the first operating condition applying a high impedance to the transmission path that carries the common clock signal; and
   at the second link during the second operating condition applying a terminating impedance to the transmission path that carries the common clock signal.

42. The method of claim 41, wherein the first link resides closer to a terminating location of the transmission path than does the second link.

* * * * *